(12) United States Patent
Sternå et al.

(10) Patent No.: US 11,548,199 B2
(45) Date of Patent: Jan. 10, 2023

(54) 3D PRINTER AND A METHOD FOR 3D PRINTING OF A CONSTRUCT

(71) Applicant: Cellink Bioprinting AB, Gothenburg (SE)

(72) Inventors: Erik Sternå, Molndal (SE); Jockum Svanberg, Gothenburg (SE); Erik Gatenholm, Gothenburg (SE); Hector Martinez, Gothenburg (SE)

(73) Assignee: Cellink Bioprinting AB, Gothenburg (SE)

( * ) Notice: Subject to any disclaimer, the term of this patent is extended or adjusted under 35 U.S.C. 154(b) by 331 days.

(21) Appl. No.: 15/995,562

(22) Filed: Jun. 1, 2018

(65) Prior Publication Data

US 2018/0345563 A1    Dec. 6, 2018

Related U.S. Application Data

(60) Provisional application No. 62/514,152, filed on Jun. 2, 2017.

(51) Int. Cl.
*B29C 64/245* (2017.01)
*B29C 64/209* (2017.01)
(Continued)

(52) U.S. Cl.
CPC ............ *B29C 48/92* (2019.02); *B29C 64/106* (2017.08); *B29C 64/209* (2017.08);
(Continued)

(58) Field of Classification Search
CPC ... B29C 64/209; B29C 64/245; B29C 64/386; B29C 64/393; B29C 48/92028; B33Y 30/00
See application file for complete search history.

(56) References Cited

U.S. PATENT DOCUMENTS

2006/0156978 A1* 7/2006 Lipson ................. B29C 64/386
                                                            118/708
2014/0117575 A1   5/2014 Kemperle et al.
                        (Continued)

FOREIGN PATENT DOCUMENTS

CN          203472159 U    3/2014
CN          204020013 U    12/2014
                        (Continued)

OTHER PUBLICATIONS

Search Report from Swedish Patent Office for Swedish priority application SE 1750700-5 dated Jan. 15, 2018.
Extended European Search Report prepared by European Patent Office for corresponding application EP 18175362.5 dated Oct. 4, 2018.

*Primary Examiner* — Elizabeth A Burkhart
(74) *Attorney, Agent, or Firm* — McCarter & English, LLP

(57) ABSTRACT

The present disclosure relates to a 3D printer (1) for 3D printing of a construct. The 3D printer (1) has a print bed (2). The 3D printer further comprises at least one actuating tool head (3) with an extrusion element (4), wherein the extrusion element and the print bed are movable in relation to each other. The 3D printer also comprises at least one sensor (5) arranged to sense a force applied to the print bed (2) by the extrusion element (4), or vice versa. The 3D printer additionally comprises a control element (7) arranged to detect when the sensed force exceeds a predetermined value and to record a position of the print bed or extrusion element related to the detection that the predetermined value is exceeded. The present disclosure also relates to corresponding methods and computer programs.

25 Claims, 2 Drawing Sheets

(51) Int. Cl.
*B33Y 30/00* (2015.01)
*B29C 48/92* (2019.01)
*B29C 64/106* (2017.01)
*B29C 64/393* (2017.01)
*B33Y 10/00* (2015.01)
*B33Y 40/00* (2020.01)
*B33Y 70/00* (2020.01)
*B33Y 80/00* (2015.01)

(52) U.S. Cl.
CPC .......... *B29C 64/245* (2017.08); *B29C 64/393* (2017.08); *B29C 2948/92028* (2019.02); *B29C 2948/92409* (2019.02); *B33Y 10/00* (2014.12); *B33Y 30/00* (2014.12); *B33Y 40/00* (2014.12); *B33Y 70/00* (2014.12); *B33Y 80/00* (2014.12)

(56) References Cited

U.S. PATENT DOCUMENTS

2014/0291886 A1* 10/2014 Mark ................ B33Y 40/00
   264/163
2015/0077215 A1*  3/2015 Ranky ............... B33Y 40/00
   338/47
2016/0236407 A1*  8/2016 Armani .............. B29C 48/30

FOREIGN PATENT DOCUMENTS

WO   WO 2006/020685 A2   2/2006
WO   WO 2016/133853 A1   8/2016
WO   WO 2017/080369 A1   5/2017

* cited by examiner

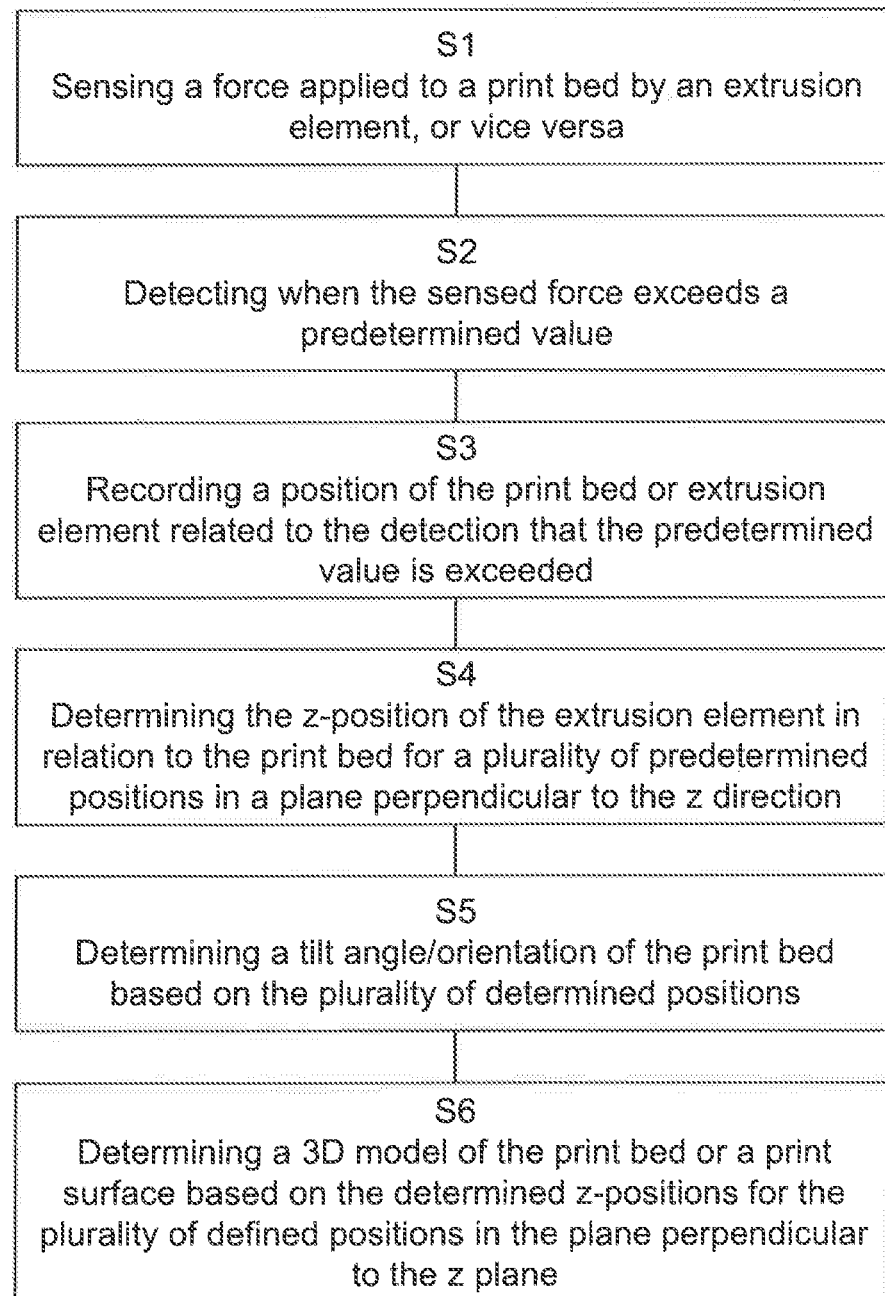

3D PRINTER AND A METHOD FOR 3D PRINTING OF A CONSTRUCT

TECHNICAL FIELD

The present disclosure relates to the field of additive manufacturing of biological materials. In particular, the present disclosure relates to a 3D printer for 3D printing of a construct. The present disclosure further relates to a method for 3D printing of a construct.

BACKGROUND ART

Printing, an additive manufacturing technology, has gained due attention for its ability to spatially control the placement of cells, biomaterials and biological molecules. Consequently, it offers endless possibilities to the future of tissue and organ regeneration, basic research and drug screening. The 3D printer is able to dispense materials while moving in X, Y, and Z directions, which enables the engineering of complex structures from the bottom up. Moreover, this technology allows the bio-fabrication of biomimetic-shaped 3D structures unique to the target tissue or organ, since it can be combined with CAD/CAM technology using patients' medical images. The development of hydrogel bioinks with good printability and bioactive properties that guide cellular fate processes would contribute to translation of this promising technology into the clinic. Hydrogels based on natural polymers are known for their favorable biocompatible properties and are attractive biomaterials for cell encapsulation. They provide an aqueous 3D environment with biologically relevant chemical and physical signals, mimicking the natural extracellular matrix environment. The materials used in printing presents unique challenges. The materials used are often soft, sensitive to physical interaction and have properties that changes with time, such as stiffness or slight volume changes. There is thus a need in the art for overcoming challenges of additive manufacturing with respect to different surface properties.

SUMMARY

One object of the invention is to obtain 3D printers which are improved over known 3D printers.

The present disclosure relates to a 3D printer for 3D printing of a construct. The present disclosure proposes a 3D printer for 3D printing of a construct. The 3D printer has a print bed. The 3D printer also has at least one actuating tool head with an extrusion element. The extrusion element and the print bed are movable in relation to each other. The 3D printer further comprises at least one sensor arranged to sense a force applied to the print bed by the extrusion element, or vice versa. The 3D printer additionally comprises a control element arranged to detect when the sensed force exceeds a predetermined value and to record a position of the print bed or extrusion element related to the detection that the predetermined value is exceeded. The disclosed 3D printer enables print surface probing. By touching the print surface, which might not be flat or well measured, with the lowest point of the extrusion element and sensing the force on the print bed, the Z-position of the print surface can be determined. This applies to any print surface that has a mechanical contact with the print bed. The disclosed 3D printer further enables printing on any surface. By probing the print surface a simple model of the print surface can be constructed and compensated for in software to allow for printing on any surface that is stable enough. The disclosed 3D printer also enables extrusion error detection. By sensing the force on the print bed and comparing that to the commands sent to the extrusion system, a closed loop printing can be achieved. If, for example, the extrusion element is clogged, broken or if the deposit material has run out, this can be detected by comparing the mass deposition on the print bed to the mass that should be deposited through the deposition program.

According to some aspects, the at least one sensor comprises a force sensing sensor arranged at the print bed.

According to some aspects, the force sensing sensor arranged at the print bed comprises a scale.

According to some aspects, the force sensing sensor is arranged at the actuating tool-head, such as at an extrusion end of the extrusion element.

According to some aspects, the 3D printer further comprises a sensor tool-head comprising the at least one force sensing sensor.

According to some aspects, the at least one sensor comprises a load cell and/or an optical sensor and/or a capacitive sensor and/or a mechanical sensor. According to some further aspects, the mechanical sensor comprises a switch.

According to some aspects, the print bed comprises a petri dish or a microwell plate or a glass slide.

According to some aspects, the recorded position of the print bed or extrusion element comprises a z-position, said z-position being substantially perpendicular to a plane of the print bed.

According to some aspects, the 3D printer further comprises a motor arrangement arranged to control a relative movement between the extrusion element and the print bed at least in the z direction.

According to some aspects, the control element is arranged to record the angular position of a motor axis of the motor arrangement as the recorded position of the print bed or extrusion element.

According to some aspects, the control element is arranged to determine the z-position of the extrusion element in relation to the print bed for a plurality of predetermined positions in a plane perpendicular to the z direction.

According to some aspects, the control element is arranged to determine a tilt angle/orientation of the print bed based on the plurality of determined positions.

According to some aspects, the control element is arranged to determine a 3D model of the print bed or a print surface based on the determined z-positions for the plurality of defined positions in the plane perpendicular to the z plane.

According to some aspects, the motor arrangement further is arranged to control a relative movement between the extrusion element and the print bed in an xy-plane perpendicular to the z direction.

According to some aspects, the motor arrangement comprises stepper motors for x, y and z axes with closed loop functionality.

According to some aspects, the 3D printer further comprises a user movable and trackable gantry, allowing the user to move the gantry while the gantry's position is tracked. This way, calibration after every such move is not needed. This further enables the user to use the gantry to tell the printer how to print.

According to some aspects, the control element is arranged to store the recorded position(s) of the print bed or extrusion element as calibration parameter values for use in subsequent control of printing.

According to some aspects, the control element is arranged to control 3D printing based on the recorded position(s). This provides calibration, which in turn allows for printing on any surface that is stable enough.

According to some aspects, the control element is arranged to continuously sense the force acting on the print bed and to compare the sensed force with commands sent to an extrusion system so as to achieve closed loop printing.

According to some aspects, the control element is arranged to continuously sense the force acting on the print bed to determine whether the extrusion element is clogged, broken and/or if the material has run out. This can be detected by comparing the mass deposition on the print bed with the material which should have been deposited according to a deposit program.

According to some aspects, the extrusion element comprises an extrusion knife.

According to some aspects, the 3D printer is arranged to be suitable for use in printing constructs that are suitable for use in any of the applications chosen from: implants in the animal or human body, such as repairing or replacing tissue, topical applications, cosmetic applications, drug test, drug discovery applications or as a disease model, or for other research, investigating or developmental purposes in the pharmaceutical, medical, chemical, personal care, skin care or cosmetic industry or any other industry for which 3D printed constructs may be of use.

The present disclosure also relates to a method and a computer program for 3D printing of a construct. The method and computer program has all the technical effects and associated advantages of the 30 printer for 3D printing of a construct.

BRIEF DESCRIPTION OF THE DRAWINGS

FIG. 2 discloses method steps of a method for 3D printing of a construct.

DETAILED DESCRIPTION

Printing, an additive manufacturing technology, has gained due attention for its ability to spatially control the placement of cells, biomaterials and biological molecules. Consequently, it offers endless possibilities to the future of tissue and organ regeneration, basic research and drug screening.

The 3D printer is able to dispense materials while moving in X, Y, and Z directions. This enables the engineering of complex constructs from the bottom up. Moreover, this technology allows for bio-fabrication of biomimetic-shaped 3D structures unique to the target tissue or organ, since it can be combined with CAD/CAM technology using patients' medical images. In a pre-printing process, a model for use by the 3D printer is created. Further, materials that will be used are chosen. Common technologies used for the pre-printing process are computed tomography, CT, and magnetic resonance imaging. To print with a layer-by-layer approach, tomographic reconstruction can be done on the images. 2D images can then be used by the printer in this layer by layer manner.

Figure 1A:
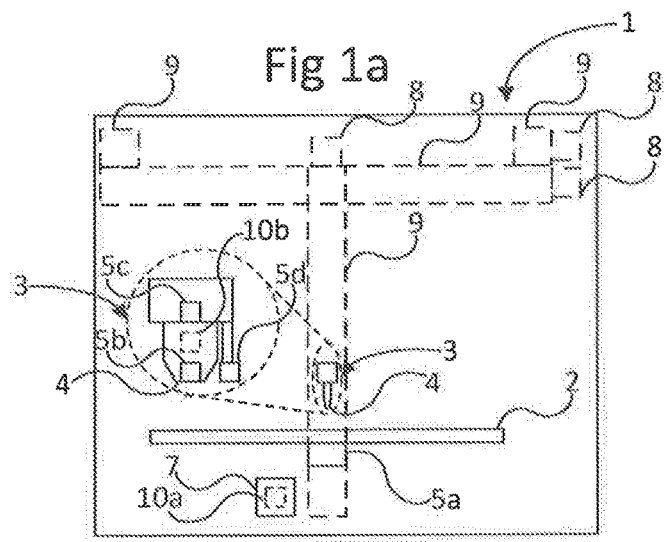
FIGS. 1a-e disclose schematically a 3D printer for 3D printing of a construct according to a first example.

FIG. 1a discloses an example of a 3D printer 1 according to the present disclosure. The 3D printer 1 can be used for manufacture of three-dimensional engineered biological tissues. The 3D printer may be for use in printing constructs that are suitable for use in any of the applications chosen from: implants in the animal or human body, such as repairing or replacing tissue, topical applications, cosmetic applications, drug test, drug discovery applications or as a disease model, or for other research, investigating or developmental purposes in the pharmaceutical, medical, chemical, personal care, skin care or cosmetic industry or any other industry for which 3D printed constructs may be of use.

The 3D printer 1 comprises a print bed 2. The print bed 2 comprises for example a petri dish. A petri dish is defined as a shallow cylindrical glass or plastic lidded dish used for culturing cells. The print bed 2 comprises in one example a microwell, also known as a microplate. The print bed 2 comprises in one example a glass slide.

The 3D printer further comprises at least one actuating tool head 3. The at least one actuating toolhead may be loaded with deposit material for use in 3D printing. Examples of actuating toolheads include pneumatic extrusion toolheads, syringe pump toolheads, inkjet toolheads, high temperature extrusion tool heads, tool heads for removal of material and/or curing toolheads. The toolheads for removal of material may comprise a knife and/or a laser toolhead and/or a milling toolhead and/or a drilling toolhead. The curing toolheads may comprise a curing UV toolhead and/or a visible light curing toolhead and/or a laser light curing toolhead. Other examples of actuating toolheads include exhaust gas toolheads for exhaust of gas such as air.

The at least one actuating tool head 3 comprises an extrusion element 4. The extrusion element is preferably arranged for extrusion of deposit material 6. The extrusion element is in one example an extrusion needle. The extrusion needle is in one example demountably arranged at the toolhead. The extrusion element 4 and the print bed 2 are movable in relation to each other. Thereby, the 3D printer is arranged to print a printed 3D article on the print bed by controlling extrusion by means of the extrusion element and by controlling a relative movement between the print bed and the extrusion element.

In one example, movement of the extrusion element is controlled in accordance with a predetermined scheme while position of the print bed is fixed. In one example movement of the print bed is controlled in accordance with a predetermined scheme while the position of the extrusion element is fixed.

Further, the 3D printer comprises at least one sensor 5a, 5b, 5c, 5d arranged to sense a force applied to the print bed by the extrusion element of the actuating toolhead, or vice versa. The at least one sensor may comprise a load cell. The load cell comprises a transducer arranged to generate an electrical signal directly proportional to the force being measured. The load cell may for example be a strain gauge load cell or a piezo-electric load cell. The at least one sensor may instead or in addition thereto comprise an optical sensor. The at least one sensor may instead or in addition thereto comprise a capacitive sensor.

According to some aspects, the at least one sensor comprises a high precision sensor, e.g. a high precision load cell, configured to determine a load at at least a half percentage accuracy, such as a full scale output linearity accuracy of a half percentage or better. The high precision sensor may further have a diameter below a predetermined highest diameter value, e.g. below 20 mm in diameter. The high precision sensor enables determination of force at high precision, which in turn enables determining deviations of print bed positioning from an ideal print bed positioning, as well as very small deformation of the print bed.

Sometimes the accuracy of force determination is less important, e.g. when only a yes-no type of sensing is involved. This may be the case if contact detection is the only thing of interest, and the forces arising at the moment of contact are allowed to vary within a predetermined range. In such cases, a force sensitive resistor, FSR, may be used as a sensor. An FSR is a resistor that changes its resistive value (in Ohms, Ψ) depending on how much it is pressed. In the case of a yes-no type of sensing, the FSR is able to determine if squeezing or pushing is taking place, as well as provide a magnitude estimate within a predetermined range specific to the FSR.

The 3D printer further comprises a control element 7 arranged to detect when the sensed force exceeds a predetermined value and to record a position of the print bed or extrusion element related to the detection that the predetermined value is exceeded. Improved 3D printing of a construct is thereby achieved, as is explained further below.

Figures 1B, 1C:
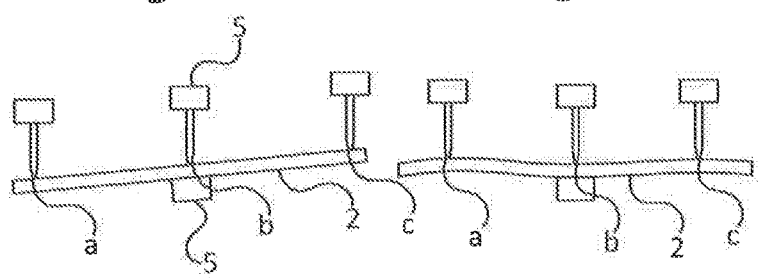

This is further illustrated in FIGS. 1b-1e where the improved 3d printing aspects are beneficial, FIGS. 1b-1c illustrate scenarios where the plane of the print bed 2 is not entirely level with respect to the extrusion element 4, i.e. not every point of the top surface of the print bed lies in the same plane. The scenarios are exaggerated for clarity. In FIG. 1b, this is illustrated by the print bed not being properly aligned. The print bed may be tilted with respect to the extrusion element 4. In FIG. 1c, this is illustrated by the print bed 2 being arranged to not have an even top surface. Such arrangements are typically unintentional, e.g. due to damage or manufacturing imperfections. Unintentional distortion of a flexible print bed may also occur due to improper arrangement of the print bed at the 3D printer 1. Non-ideal surfaces may result in the deposit material not being deposited properly on the surface, resulting in the material not sticking to the surface and eventually leading to at least part of the construct being displaced during printing. Another problem that may arise from non-ideal surfaces is that defects are introduced and propagated throughout the construct during printing. For instance, different segments in a layer are not properly aligned, which is propagated through the construct during printing. Rather than the segments being printed alongside each other at each layer, they may have a slight angle with respect to each other, eventually leading to the segments colliding or moving away from each other rather than staying parallel throughout the layer-by-layer printing process. The disclosed printer provides a remedy by enabling a mapping of the surface on which the construct is to be printed, i.e. the initial print surface. Initially, when no deposit material 6 has been deposited, the print surface will be the top surface of the print bed 2. By sensing the force applied to the print bed 2 by the extrusion element 4 of the actuating toolhead 3, or vice versa, it is possible to determine a distance of a point on the print bed to a reference plane. The sensed force exceeding the predetermined value may be used to indicate that the extrusion element 4 is in contact with the print bed 2. By recording the position of the print bed or extrusion element related to the detection that the predetermined value is exceeded, a deviation of the recorded position with the reference plane can be determined. By recording a plurality of positions, illustrated by exemplary positions a, b and c in FIGS. 1b and 1c, the shape and/or orientation of the print bed 2 can be determined prior to starting the printing process. In other words, a model of the print surface may be generated. Depending on circumstances, the print bed can then be adjusted based on the measurements and/or the printing process can be adjusted to take the model into consideration.

Figure 1D:
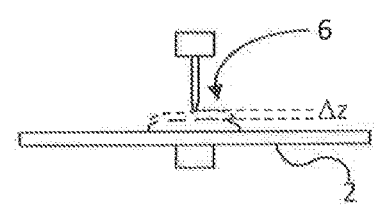
Figure 1E:
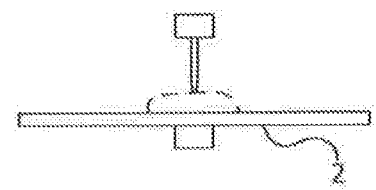

FIGS. 1d-1e illustrate a deposit material having an uneven print surface and a softness changing in time, from soft enough to deform Δz by a first force from the extrusion element in FIG. 1d to stiff enough to resist deformation due to the first force in FIG. 1e.

A further problem, which is unique to biological materials, is that the material properties of different deposit materials may vary greatly during the duration of the printing process. For instance, the deposit materials may vary with respect to their ability to deform due to an applied force. Further, the ability to deform due to an applied force may vary with time. A deposit material which is initially soft may harden over time. The deposit material may also change volume over time. For instance, some materials contain water, which may evaporate over time, thereby shrinking the volume of the deposit material. Since the first layers of the construct may be deposited many hours before the final layers, the shape of the constructs first layers may have changed when the final layers are applied. The changes in shape may affect the current print surface, which is the surface on which deposit material is currently to be deposited. The disclosed 3d printer 1 enables monitoring the changing conditions by repeated force sensing and recording of the position of the print bed or extrusion element related to the detection that the predetermined value is exceeded.

In different examples, the at least one sensor 5a, 5b, 5c, 5d comprises a force sensing sensor 5a arranged at the print bed 2. The force sensing sensor 5a arranged at the print bed comprises for example a scale.

The at least one sensor 5a, 5b, 5c, 5d is in one example mounted at the actuating toolhead, such as at an extrusion end of the extrusion element 4, illustrated by sensor 5b. In another example, a force sensing sensor 5c is arranged at a position above the extrusion element 4.

The force sensing sensor 5c is then arranged to measure the force indirectly via force propagation from a point of contact between the end of the extrusion element and a surface, through the extrusion element 4 and to the force sensing sensor 5c. According to some aspects, the force sensor 5c is arranged at a holder arranged to hold the actuating toolhead. According to some further aspects, the force sensor 5c arranged at the holder comprises a mechanical switch. The mechanical switch is preferably arranged to switch from a first state to a second state based on the sensed force exceeding a predetermined threshold. The predetermined threshold is preferably set to indicate contact with the toolhead and a print surface.

The at least one sensor 5a, 5b, 5c, 5d is in one example mounted at a separate sensor toolhead or mechanically coupled to the toolhead 3, as illustrated by sensor 5d. In the example, wherein the movement of the extrusion element is controlled, a movement of the at least one sensor is then coordinated with the movement of the extrusion element.

The at least one sensor may also comprise other sensors than force sensing sensors. Those sensors may comprise be formed in dedicated sensing toolheads such as camera toolheads, probing toolheads and/or 3D scanning toolheads.

The 3D printer further comprises a motor arrangement 8 comprising at least one motor. The motor arrangement is arranged to control a relative movement between the extrusion element and the print bed. The motor arrangement is in one example arranged to control the motion of the extrusion element of the actuator toolhead. The motor arrangement 8 is in one example instead or in addition thereto arranged to control the motion of the toolhead. The motor arrangement is in one example instead or in addition thereto arranged to control the motion in of the print bed.

In different examples, the motor arrangement 8 is arranged to control a relative movement between the extrusion element and the print bed at least in a z direction. The z-direction is characteristically substantially perpendicular to a plane of the print bed.

In different examples, the motor arrangement 8 is arranged to control the relative movement between the extrusion element 4 and the print bed 2 in three dimensions, herein illustrated by mutually orthogonal directions x, y and z. The motor arrangement may then be arranged to control a relative movement between the extrusion element and the print bed in the plane perpendicular to the z direction. Thus the motor arrangement is in accordance with this example arranged to control the relative movement between the extrusion element and the print bed in x, y and z directions. The motor arrangement may further be arranged to control a rotational orientation of the extrusion element in relation to the print bed. In one example the rotational orientation is static. The static rotational orientation between the print bed and the extrusion element may for example be a perpendicular angle. In one example, the rotational orientation is dynamic. The rotational orientation may then be adapted in accordance with settings in accordance with the predetermined scheme to obtain the desired construct.

The motor arrangement 8 comprises in different examples stepper motors for x, y and z axes with closed loop functionality. The motor arrangement 8 may also comprise stepper motors with open loop functionality. In some examples, the motor arrangement 8 comprises direct current, DC, motors and/or brushless DC, BLDC, motors.

The control element 7 preferably further comprises a processing element in communication with/comprises a memory arranged to store a program code for control of the operation of the 3D printer. The memory is arranged to store a scheme representing a model of a material to be printed. The scheme may comprise a sequence of coordinates and orientations and an extrusion amount associated to the respective coordinate/orientation. The scheme may be associated to actuator toolhead type and size, material type, and/or extrusion element type and size.

The recorded position of the print bed or extrusion element comprises a z-position. The z-position is substantially perpendicular to a plane of the print bed. The control element may be arranged to record the angular position of a motor axis of the motor arrangement as the recorded position of the print bed or extrusion element.

The control element may be arranged to determine the z-position of the extrusion element in relation to the print bed for a plurality of predetermined positions in an xy-plane perpendicular to the z direction. The control element may then be arranged to determine a tilt angle/orientation of the print bed based on the plurality of determined positions. The control element may be arranged to determine a 3D model of the print bed or a print surface based on the determined z-positions for the plurality of defined positions in the plane perpendicular to the z plane, as has been discussed before.

The control element is in different examples arranged to store the recorded position(s) of the print bed or extrusion element as calibration parameter values for use in subsequent control of printing. The control element can then be arranged to control 3D printing based on the recorded position(s). Thereby, calibration is provided. Further, when recording and storing positions of the print bed or extrusion element, this allows for printing on any surface that is stable enough.

The control element arranged to control 3D printing based on the recorded position(s) may be arranged to continuously sense the force acting on the print bed. The sensed force may be compared with commands sent to an extrusion system so as to achieve closed loop printing. Instead or in addition thereto, the control element may be arranged to continuously sense the force acting on the print bed to determine whether the extrusion element is clogged, broken and/or if the material has run out. This can be detected by comparing the mass deposition on the print bed with the material which should have been deposited according to a deposit program. At each instant in time during printing, a known volume of deposit material 6 is to be added to the construct. Knowing the density of the deposit material, the known volume can be correlated to a known mass to be added to the construct. The added mass will manifest as an increased force on the print bed 2, which can be measured by e.g. a sensor 5a comprising a scale arranged to determine a net force acting on the print bed 2. In other words, the measured force is proportional to a corresponding load on the print bed, which in turn is proportional to a total mass of deposit material deposited on the print bed. If the printing process is executed, but no added mass is sensed by the sensor 5a, this may imply that there is no deposit material 6 being added to the construct, or elsewhere on the print bed. The measured absence of added deposit material may be due to the extrusion element being clogged, broken and/or the deposit material having run out. Alternatively, if it can be determined that deposit material is being added, the measured absence of deposit material may be used to indicate that the sensor 5a is malfunctioning.

According to some aspects, the amount of deposit material being deposited per a unit of time is determined. The determination may be performed by determining the force on the print bed as a function of time. In one example, the force on the print bed is registered at a plurality of times, e.g. at regular time intervals. By comparing the forces at two adjacent times, a change in force over a time period corresponding to the time elapsed between the two adjacent times can be determined. The change in force can be used to determine a corresponding change in mass, i.e. how much deposit material has been added. Knowing the density of the deposit material, a corresponding change in volume can also be determined. Alternatively, the amount of deposit material deposited per unit time can also be determined by a so-called central difference, which estimates the change in force at a time between two flanking, i.e. one before and one after, points in time. Using a central difference typically improves accuracy in estimation compared to using only two adjacent points. This is particularly useful if the separation between the points in time when the force acting on the print bed is determined is short in comparison to a timescale suitable for representing the printing process. Once a temporal relationship has been established for the deposition of deposit material, the temporal relationship can be used in a number of ways to improve the printing process, as will be described further below.

In one example, the temporal relationship is used in error detection in extrusion for an even flow extrusion element. By comparing the determined mass per unit time, which is given by the temporal relationship, with the flow rate of the extrusion element, e.g. the rate of feeding filament, flow rate can be regulated, e.g. via a feedback loop.

In another example, printing speed is regulated based on the temporal relationship. In 3D printing it is generally desirable to be able to print as fine features as possible. Most deposit materials tend to spread out as soon as it exits the extrusion element. By moving the extrusion element in a direction perpendicular to the direction at which the deposit material is extruded, the deposit material will be thinned in relation to the speed of the extrusion element. If the speed of the extrusion element is too great, there will be errors, e.g. disruptions or regions of deposit material that become too thin to enable further printing of the construct. In other words, the speed of the extrusion element can be used to regulate the thickness of the features of the deposit material as it is being printed. Thus, the temporal relationship provides information of how much deposit material is currently being added. The information of how much deposit material is currently being added is then used to regulate printing speed. For example, if a large amount of mass is being extruded, as measured by the sensor 5a as an increased force acting on the print bed, the print speed can be increased accordingly and make thinner printed features.

The 3D printer may further comprise a user movable and trackable gantry 9, allowing the user to move the gantry while the gantry's position is tracked. This way, calibration after every such move is not needed. The user can also use the gantry to tell the printer how to print.

At least one of the toolheads 3 may have processing capacity. Processing for control of operation of the toolheads can be performed either by toolhead processing element(s) 10b or a processing element 10a of the control element 7. In an alternative example, the processing capacity of both the processing element 10a of the control element and at least one of the toolhead processing element(s) 10b are used for control of operation of the toolheads. In accordance with this example, either the processing element 10a of the control element or at least one of the toolhead processing elements 10b is/are acting as master processor and the other processor(s) are acting as slave processor, or vice versa.

Thus, the toolhead processing element(s) may have processing capacities which in one example is used to at least partly control operation of its toolhead or other equipment such as another toolhead and/or an exhaust for gas. One advantage with implementing this functionality at the toolhead processing elements) is that software within the control element may not need to be amended and updated, or at least only minor updates are necessary, when updated toolheads are mounted to the 3D printer. Thus, an existing 3D printer may be upgraded with new toolhead technologies substantially without amending the software of the control element.

The processing element of the control element and/or toolhead processing elements) may be arranged to at least partly control operation such as extrusion control and/or extrusion material temperature control and/or extrusion material viscosity control and/or gas supply control.

The processing element of the control element and/or toolhead processing element(s) may be arranged to at least partly control operation of the based on information related to material properties such as viscosity and/or temperature, and/or based on information related to nozzle diameter used to extrude.

The toolhead processing element of the toolhead and/or processing element of the control element may be arranged to at least partly monitor operation such as monitoring of extrusion material temperature and/or extrusion material level and/or extrusion material viscosity and/or ambient light and/or exhaust gas monitoring and/or wherein the toolhead processing element is arranged to perform data collection and to report via the communication interface part monitoring of the operation and/or wherein the toolhead processing element is arranged to perform error detection and to report said error via the communication interface part.

Further, the 3D printer 1 may comprise a user interface 21 arranged for user input and/or display of information.

FIG. 2 illustrates method steps of a method for 3D printing of a construct. The method, which is carried out in a 3D printer as described above and below, comprises sensing S1 a force applied to the print bed by the extrusion element, or vice versa. The method further comprises detecting S2 when the sensed force exceeds a predetermined value. The method also comprises recording S3 a position of the print bed or extrusion element related to the detection that the predetermined value is exceeded. The method thereby enables 3D printing of a construct as described above in relation to FIGS. 1a-e. The method is preferably repeated for a plurality of points on e.g. the print bed and/or the construct during printing in order to determine surface properties which may affect the printing of the construct. In other words, according to some aspects the method further comprises determining S4 the z-position of the extrusion element in relation to the print bed for a plurality of predetermined positions in a plane perpendicular to the z direction.

According to some aspects the method further comprises determining S5 a tilt angle/orientation of the print bed based on the plurality of determined positions.

According to some aspects the method further comprises determining S6 a 3D model of the print bed or a print surface based on the determined z-positions for the plurality of defined positions in the plane perpendicular to the z plane.

The present disclosure also relates to a computer program for 3D printing of a construct. The computer program comprises computer program code which, when executed in a processor in or communicatively connected to a 3D printer as described above and below, causes the 3D printer to carry out the method as described above and below.

The invention claimed is:

1. A 3D printer for 3D printing of a construct, wherein the 3D printer is a 3D bioprinter having
  a print bed,
  at least one actuating tool head with an extrusion element, wherein the extrusion element and the print bed are movable in relation to each other,
  at least one sensor arranged to sense a force applied to the print bed by the extrusion element, or vice versa, wherein the at least one sensor comprises a force sensing sensor arranged at the print bed and wherein the force sensing sensor senses an added mass of a printed deposit material, and
  a control element arranged to detect when the sensed force exceeds a predetermined value and to record a position of the print bed or extrusion element related to the detection that the predetermined value is exceeded, wherein the control element is arranged to continuously sense the force acting on the print bed and to compare the sensed force with commands sent to an extrusion system so as to achieve closed loop printing.

2. The 3D printer according to claim 1, wherein the force sensing sensor arranged at the print bed comprises a scale.

3. The 3D printer according to claim 1, further comprising a sensor arranged at the actuating tool head at an extrusion end of the extrusion element.

4. The 3D printer according to claim 1, further comprising a sensor tool-head comprising a sensor.

5. The 3D printer according to claim 1, wherein the at least one sensor comprises a load cell and/or an optical sensor and/or a capacitive sensor and/or a mechanical sensor.

6. The 3D printer according to claim 1, wherein the print bed comprises a petri dish or a microwell plate or a glass slide.

7. The 3D printer according to claim 1, wherein the recorded position of the print bed or extrusion element comprises a z-position, said z-position being substantially perpendicular to a plane of the print bed.

8. The 3D printer according to claim 7, further comprising a motor arrangement arranged to control a relative movement between the extrusion element and the print bed at least in the z direction.

9. The 3D printer according to claim 8, wherein the control element is arranged to record the angular position of a motor axis of the motor arrangement as the recorded position of the print bed or extrusion element.

10. The 3D printer according to claim 8, wherein the motor arrangement further is arranged to control a relative movement between the extrusion element and the print bed in an xy-plane perpendicular to the z direction.

11. The 3D printer according to claim 10, wherein the motor arrangement comprises stepper motors for x, y and z axes with closed loop functionality.

12. The 3D printer according to claim 11, further comprising a user movable and trackable gantry, allowing the user to move the gantry while the gantry's position is tracked.

13. The 3D printer according to claim 12, wherein the control element is arranged to continuously sense the force acting on the printbed to determine whether the extrusion element is clogged, broken and/or if the material has run out.

14. The 3D printer according to claim 7, wherein the control element is arranged to determine the z-position of the extrusion element in relation to the print bed for a plurality of predetermined positions in a plane perpendicular to the z direction.

15. The 3D printer according to claim 14 wherein the control element is arranged to determine a tilt angle/orientation of the print bed based on the plurality of determined positions.

16. The 3D printer according to claim 14, wherein the control element is arranged to determine a 3D model of the print bed or a print surface based on the determined z-positions for the plurality of defined positions in the plane perpendicular to the z plane.

17. The 3D printer according to claim 1, wherein the control element is arranged to store the recorded position(s) of the print bed or extrusion element as calibration parameter values for use in subsequent control of printing.

18. The 3D printer according to claim 17, wherein the control element is arranged to control 3D printing based on the recorded position(s).

19. The 3D printer according to claim 1, wherein the extrusion element comprises an extrusion knife.

20. The 3D printer according to claim 1, for use in printing constructs that are suitable for use in any of the applications chosen from: implants in an animal or human body, repairing or replacing tissue in an animal or human body, topical applications, cosmetic applications, drug test, drug discovery applications or as a disease model, or for other research, investigating or developmental purposes in the pharmaceutical, medical, chemical, personal care, skin care or cosmetic industry or any other industry for which 3D printed constructs may be of use.

21. Method, performed by a 3D printer according to claim 1, for 3D printing of a construct, the method comprising the steps of:
   continuously sensing (S1) a force applied to the print bed by the extrusion element, or vice versa;
   detecting (S2) when the sensed force exceeds a predetermined value;
   recording (S3) a position of the print bed or extrusion element related to the detection that the predetermined value is exceeded, and
   comparing the sensed force with commands sent to the extrusion system so as to achieve the closed loop printing.

22. The method according to claim 21, wherein the method further comprises repeating (S4) the steps S1-S3 for a plurality of predetermined positions in a plane substantially perpendicular to the direction of the force.

23. The method according to claim 22, wherein the method further comprises
   determining (S5) a tilt angle/orientation of the print bed based on the plurality of determined positions.

24. The method according to claim 22, wherein the method further comprises
   determining (S6) a 3D model of the print bed or a print surface based on the determined z-positions for the plurality of defined positions in the plane perpendicular to the z plane.

25. A computer program for 3D printing of a construct comprising computer program code which, when executed in a processor in or communicatively connected to a 3D printer according to claim 1, causes the 3D printer to carry out a method for 3D printing of a construct, the method comprising:
   continuously sensing (S1) a force applied to the print bed by the extrusion element, or vice versa;
   detecting (S2) when the sensed force exceeds a predetermined value;
   recording (S3) a position of the print bed or extrusion element related to the detection that the predetermined value is exceeded, and
   comparing the sensed force with commands sent to the extrusion system so as to achieve the closed loop printing.

* * * * *